Dec. 15, 1964    C. R. SALTER ETAL    3,161,452
MOUNTING ADAPTER FOR ELECTRICAL CONNECTORS
Filed Sept. 5, 1963

Calvin R. Salter
Kenneth H. Pascoe,
  INVENTORS.
BY

United States Patent Office 3,161,452
Patented Dec. 15, 1964

3,161,452
MOUNTING ADAPTER FOR ELECTRICAL
CONNECTORS
Calvin R. Salter, Tewksbury, and Kenneth H. Pascoe, Lexington, Mass., assignors, by mesne assignments, to the United States of America as represented by the Secretary of the Army
Filed Sept. 5, 1963, Ser. No. 306,966
4 Claims. (Cl. 339—131)

The present invention relates to a quick mounting adapter for miniature electrical connectors and more specifically to an adapter which may be installed without requiring access to the underside of a plate or housing to which it is to be mounted. In the design of electronic control systems of missiles, it is essential to utilize all available space to the greatest possible advantage. It has been found that the size of the components of present electronic control systems have been kept to a minimum, but with the present components, a great deal of space is required to provide working room for insertion and removal of the components. With this in mind, there is a need for components which require a minimum amount of working space for insertion and removal purposes, and this invention is provided to help eliminate this problem insofar as electrical connectors and adapters are concerned.

Therefore, it is an object of this invention to provide an adapter for miniature electrical connectors which may be mounted on the exterior of a mounting plate with a minimum of working space on the underside of the plate.

Another object is to provide an adapter which will permit disassembly of an electrical connector from the exterior of its mounting without disassembling the components of the basic electronic system.

A further object is to provide an adapter which will conceal and protect the contents of the connection.

A further object is to provide an adapter which may be flush mounted.

Yet another object is to provide an adapter which may be simply and quickly attached to a mounting plate.

In accordance with this invention, a mounting adapter for electrical connectors is provided that includes a ferrule, a nut and an insert. The ferrule has a body portion, with a lip portion on one end and a sleeve portion on the other end. The sleeve portion is adapted to be inserted through a hole in a mounting plate and have the inserted end flanged into securing relation with the mounting plate. The nut has a collar which cooperates with the lip portion of the ferrule to define a rotary connection, and the insert is inserted into a receiver portion of the nut and secured thereto.

Other features of this invention will become apparent in the course of the following description hereof with reference to the accompanying drawings given merely by way of example and in which.

Figure 1:
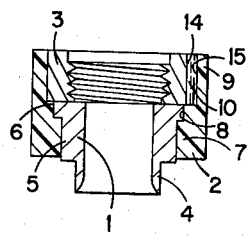
FIGURE 1 is a cross-sectional view of the device in its assembled form and before mounting.

The adapter according to the invention, as illustrated in FIGURE 1, consists of three major elements, these being a ferrule 1, a nut 2, and an insert 3. Each of these elements may be made from any suitable material. However because of the ease in varying its ductility, plastic is most suitable. Ferrule 1 comprises an extended sleeve 4, a body portion 5 and a lip portion 6. The extended sleeve is an important aspect of this invention in that it may be formed of a material which is more ductile than the remainder of the ferrule so as to facilitate mounting of the device without sacrificing strength. Nut 2 is rotatably mounted on ferrule 1 and consists of a collar 7, a step portion 8, and a receiver portion 9. Insert 3 is mounted within the receiver portion of nut 2 and is attached thereto by an adhesive or other suitable means. A semi-circular slot 14 is formed on the radially outer surface of the insert and is aligned with a similar slot 15 on the radially inner surface of the receiver. The cylindrical aperture thus formed receives a pin 10 which prevents relative rotation between the insert and the receiver. The radially inner surface of insert 3 is threaded to receive an electrical connector.

Figure 2:
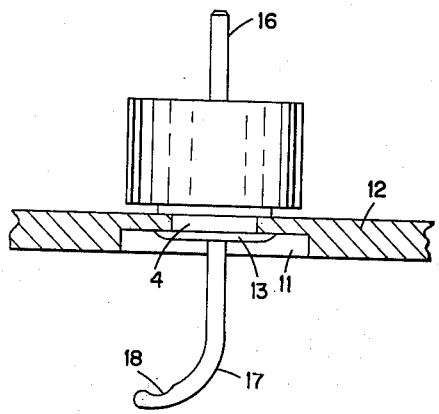
FIGURE 2 is an elevational view showing the device which is mounted to a plate and also illustrates one type of spinning tool used in mounting the device.

The adapter, as illustrated in FIGURE 2, is mounted in a recess 11 of a mounting plate 12. The end portion of the extended sleeve 4 is turned radially outwardly to form a flange 13 which rigidly attaches the adapter to the mounting plate. A tool utilized for flanging the sleeve of the adapter is also illustrated in FIGURE 2. This tool is an exteriorly operated spinning tool and comprises a shank portion 16, a hook 17 and a groove 18.

Figure 3:
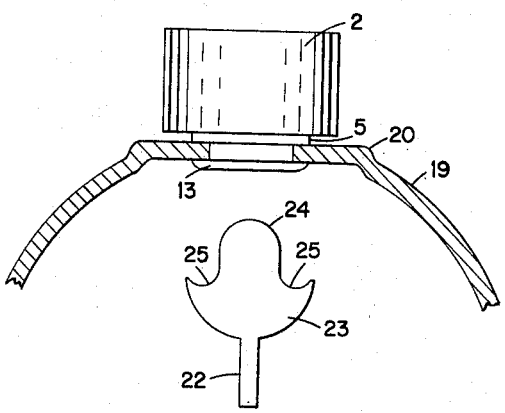
FIGURE 3 is an elevational view of the device as mounted on a dimpled mounting plate and also showing a type of spinning tool used for mounting the device.

The adapter illustrated in FIGURE 3 is mounted on a dimpled housing 19 and is accessible from the interior thereof. This type of mounting is often used in the construction of electric motors. The dimpled portion 20 of the housing effectively serves as a recess for the flange portion 13 of the adapter. FIGURE 3 also illustrates a spinning tool which is utilized for forming flange 13 when the interior of the housing is accessible. This spinning tool consists of a shaft 22, a body portion 23, a guide portion 24 and flanging grooves 25.

Figure 4:
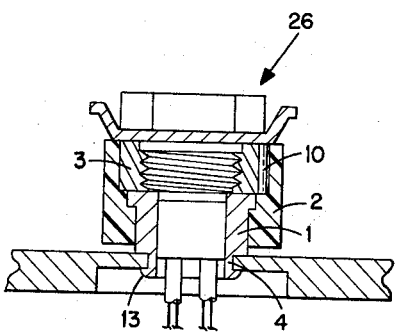
FIGURE 4 is a cross-sectional view of a mounted adapter having connectors inserted therein.

FIGURE 4 illustrates the assembled adapter having a connector 26 threadedly attached thereto.

The operation or assembly of the device is quite simple and requires a minimum of time and effort. Nut 2 is slipped over ferrule 1, insert 3 is placed inside receiver portion 9 of the nut and suitably secured, as for example, by an adhesive. Pin 10 is then pressed into the preformed aperture provided by alignment of semi-circular slots 14 and 15 of the insert and the nut respectively. Attachment of the device to the mounting plate is equally simple. In the case of a lack of accessibility from the interior of the mounting plate or housing the exterior or hook type spinning tool is inserted in the central opening of the adapter, the groove 18 of the tool is engaged with extended sleeve 4 and a slight upward pressure is exerted while rotating the spinning tool, thus flanging the extended sleeve and rigidly securing the adapter to the mounting plate. When access to the interior of the mounting plate is possible the interior spinning tool, illustrated in FIGURE 3, is utilized by extending guide portion 24 into the central opening of the adapter and rotating the tool so as to form flange 13. Connector 26 is attached by feeding electrical leads through the hole in the center of the adapter, plugging them into the connector and rotating the nut 2 while engaging the threaded portion of the connector 26 with the threaded portion of the insert 3 of the adapter.

Thus, it will be seen that the adapter described hereinabove provides an efficient solution to the problem of installation of adapters wherein a minimum of space is available within an electronic assembly. The ferrule portion of the adapter is of course formed of material which is easily flanged and yet maintains ample strength to retain the adapter in place under the most severe conditions.

While the foregoing is a description of the preferred embodiment, the following claims are intended to include those modifications and variations that are within the spirit and scope of our invention.

We claim:

1. An adapter for mounting an electrical connector, said adapter comprising: a hollow ferrule having a lip portion, a body portion and an extended sleeve, the diameter of said lip portion being larger than the diameter of said body portion and the diameter of said body portion being larger than the diameter of the said extended sleeve; a nut rotatably mounted on said ferrule, said nut having a collar, a step portion and a receiver portion, the inside diameter of said receiver portion having a semi-circular slot therein, the inside diameter of said collar and step portions being approximately the same as respective outside diameters of the body and lip portions of the ferrule; a cylindrical insert having its inner surface threaded, a semi-circular slot in the outer surface of said cylindrical insert, said insert being mounted within the receiver portion of said nut so as to align the semi-circular slots of the nut and insert; means mounted in said aligned semi-circular slots to prevent relative rotation between said nut and said insert; and means for attaching said insert to said nut.

2. A device as set forth in claim 1 wherein said means to prevent relative rotation between said nut and said insert is a cylindrical pin.

3. A device as set forth in claim 1 wherein said means for attaching said insert to said nut is an adhesive.

4. A device as set forth in claim 1 wherein the extended sleeve portion is more ductile than the body and lip portion of said ferrule.

References Cited by the Examiner
UNITED STATES PATENTS

| | | | |
|---|---|---|---|
| 2,305,197 | 12/42 | Sheridan | 285—202 |
| 2,400,348 | 5/46 | Greene | 151—57 X |
| 2,515,220 | 7/50 | Hattan | 151—14 |
| 2,842,384 | 7/58 | Foskett | 285—203 |
| 2,992,403 | 7/61 | Hawk | 339—131 X |
| 3,120,985 | 2/64 | Hubbell | 339—31 |

JOSEPH D. SEERS, *Primary Examiner.*